United States Patent
Iikawa et al.

(10) Patent No.: US 6,867,926 B2
(45) Date of Patent: Mar. 15, 2005

(54) CAM RIB SUPPORT STRUCTURE

(75) Inventors: Makoto Iikawa, Saitama (JP); Masashi Takahashi, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/695,909

(22) Filed: Oct. 30, 2003

(65) Prior Publication Data

US 2004/0090681 A1 May 13, 2004

(30) Foreign Application Priority Data

Oct. 31, 2002 (JP) ........................................ 2002-318380

(51) Int. Cl.⁷ .............................................. G02B 15/14
(52) U.S. Cl. ...................... 359/701; 359/694; 359/699; 359/700; 359/695
(58) Field of Search ............................... 359/694, 695, 359/699–701, 822, 823

(56) References Cited

U.S. PATENT DOCUMENTS

| | | | |
|---|---|---|---|
| 5,446,593 A | 8/1995 | Hamasaki et al. | 359/764 |
| 5,731,913 A | 3/1998 | Imanari | 359/700 |
| 6,631,035 B2 * | 10/2003 | Iikawa et al. | 359/699 |
| 6,661,586 B2 * | 12/2003 | Nomura et al. | 359/699 |
| 6,747,807 B2 * | 6/2004 | Iikawa et al. | 359/694 |

FOREIGN PATENT DOCUMENTS

JP 8-146278 6/1996

* cited by examiner

Primary Examiner—Georgia Epps
Assistant Examiner—Jack Dinh
(74) Attorney, Agent, or Firm—Greenblum & Bernstein, P.L.C.

(57) ABSTRACT

A cam mechanism includes a cam ring including a cam rib which is formed on a peripheral surface of the cam ring; and a follower ring which is concentric with the cam ring, the follower ring including a pair of cam followers which hold the cam rib between the pair of cam followers. Upon the cam ring and the follower ring being engaged with each other in an assembly process thereof, an inner cam follower of the pair of cam followers first approaches an end of the cam rib in a lengthwise direction thereof, and an outer cam follower of the pair of cam followers subsequently approaches the same end of the cam rib. A portion of the outer cam follower is extended outwards from a position of a peripheral surface of the inner cam follower in a circumferential direction of the follower ring.

9 Claims, 5 Drawing Sheets

CAM RIB SUPPORT STRUCTURE

BACKGROUND OF THE INVENTION

1. Field of the Invention

The present invention relates to a cam mechanism which includes a cam ring on which at least one cam rib is formed and which can be used in a lens barrel, e.g., a photographing lens of a camera. More specifically, the present invention relates to a cam rib support structure which supports each cam rib by an associated pair of cam followers formed on a follower ring which is provided concentrically with the cam ring.

2. Description of the Related Art

A cam mechanism including a cam ring and a follower ring which are concentrically arranged, wherein at least one cam rib extending non-linearly is formed on an inner or outer peripheral surface of the cam ring while a corresponding at least one pair of cam followers are formed on an outer or inner peripheral surface of the follower ring, is known in the art. This type of cam mechanism will be hereinafter referred to as "cam-rib-incorporated cam mechanism". The present invention relates to a support structure of the cam-rib incorporated cam mechanism which supports each cam rib by an associated pair of cam followers therebetween which are formed on the follower ring. This type of support structure will be hereinafter referred to as "cam rib support structure." In the cam rib support structure, if the primary cam diagram of the cam rib has only a circumferential component (i.e., if the primary cam diagram extends only in a circumferential direction of the cam ring), the pair of cam followers must be positioned apart from each other in the axial direction of the follower ring to hold the associated cam rib between the pair of cam followers. In other words, a pair of cam followers cannot hold the associated cam rib therebetween if positioned apart from each other only in a circumferential direction of the follower ring. The follower ring is usually guided linearly along the optical axis without rotating. Accordingly, rotating the cam ring forward and reverse causes the follower ring to move forward and rearward in the axial direction thereof.

In the cam rib support structure, during assembly thereof, one of the cam ring and the follower ring is inserted into the other so that that each cam rib is positioned between the associated pair of cam followers. In this assembly operation, one of the cam ring and the follower ring must be rotated relative to the other in a state where one of the opposite ends (insertion end) of each cam rib in the lengthwise direction thereof is positioned in between the associated pair of cam followers in the axial direction of the cam ring and the follower ring. However, the axial position of each pair of cam followers on the follower ring cannot be visually identified from the outside of the follower ring because one of the cam ring and the follower ring is positioned around the other. Accordingly, a special assembly jig or skill is conventionally required to assemble the cam ring and the follower ring together. This makes the process of assembling the cam ring and the follower ring difficult.

SUMMARY OF THE INVENTION

The present invention provides a cam rib support structure of a cam mechanism including a cam ring and a follower ring which are concentrically arranged, wherein at least one cam rib extending non-linearly is formed on an inner or outer peripheral surface of the cam ring while corresponding at least one pair of cam followers is formed on an outer or inner peripheral surface of the follower ring, and wherein the cam rib can be easily engaged in between the pair of cam followers.

According to an aspect of the present invention, a cam mechanism is provided, including a cam ring including at least one cam rib which is formed on a peripheral surface of the cam ring to extend non-linearly; and a follower ring which is concentric with the cam ring, the follower ring including at least one pair of cam followers which are formed on a peripheral surface of the follower ring to be positioned apart from each other in an axial direction of the follower ring to hold the cam rib between the pair of cam followers. Upon the cam ring and the follower ring being engaged with each other in an assembly process thereof, an inner cam follower of the pair of cam followers firstly approaches one of opposite ends of the cam rib in a lengthwise direction thereof, and an outer cam follower of the pair of cam followers subsequently approaches the one of the opposite ends of the cam rib. A portion of the outer cam follower is extended outwards from a position of a peripheral surface of the inner cam follower in a circumferential direction of the follower ring.

It is desirable for a circumferential width of the outer cam follower to be greater than a circumferential width of the inner cam follower.

It is desirable for the outer cam follower and the second cam follower to be positioned to be symmetrical to a center line extending parallel to an axis of the follower ring.

It is desirable for the cam ring and the follower ring to be elements of a lens barrel, the follower ring being guided linearly along an optical axis of the lens barrel without rotating.

It is desirable for the lens barrel to include a linear guide member having at least one linear guide groove for guiding the follower ring linearly along the optical axis without rotating the follower ring, the pair of cam followers being formed on an end of a linear guide projection which is engaged in the linear guide groove.

It is desirable for opposite side end portions of the outer cam follower with respect to the center line to each include a beveled surface, so that the one of opposite ends can easily be led into a space between the outer cam follower and the inner cam follower.

The cam mechanism can further include an intermediate ring which is disposed concentrically between the cam ring and the follower ring. One of the cam ring and the follower ring is inserted into the intermediate ring in the assembly process of the cam ring and the follower ring.

The lens barrel can serve as a photographing lens

In another embodiment, a cam mechanism is provided, including a cam ring including at least one cam rib which is formed on a peripheral surface of the cam ring to extend non-linearly; and a follower ring which is concentric with the cam ring, and includes at least one pair of cam followers which are formed on a peripheral surface of the follower ring to be positioned apart from each other in an axial direction of the follower ring to hold the cam rib between the pair of cam followers. The pair of cam followers are positioned to be symmetrical to a center line extending parallel to an axis of the follower ring. Upon the cam ring and the follower ring being engaged with each other in an assembly process thereof, a circumferential width of one of the pair of cam followers which firstly approaches one of opposite ends of the cam rib in a lengthwise direction thereof is smaller than a circumferential width of the other of the pair of cam followers which subsequently approaches the one of the opposite ends of the cam rib.

The present disclosure relates to subject matter contained in Japanese Patent Application No.2002-318380 (filed on Oct. 31, 2002) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
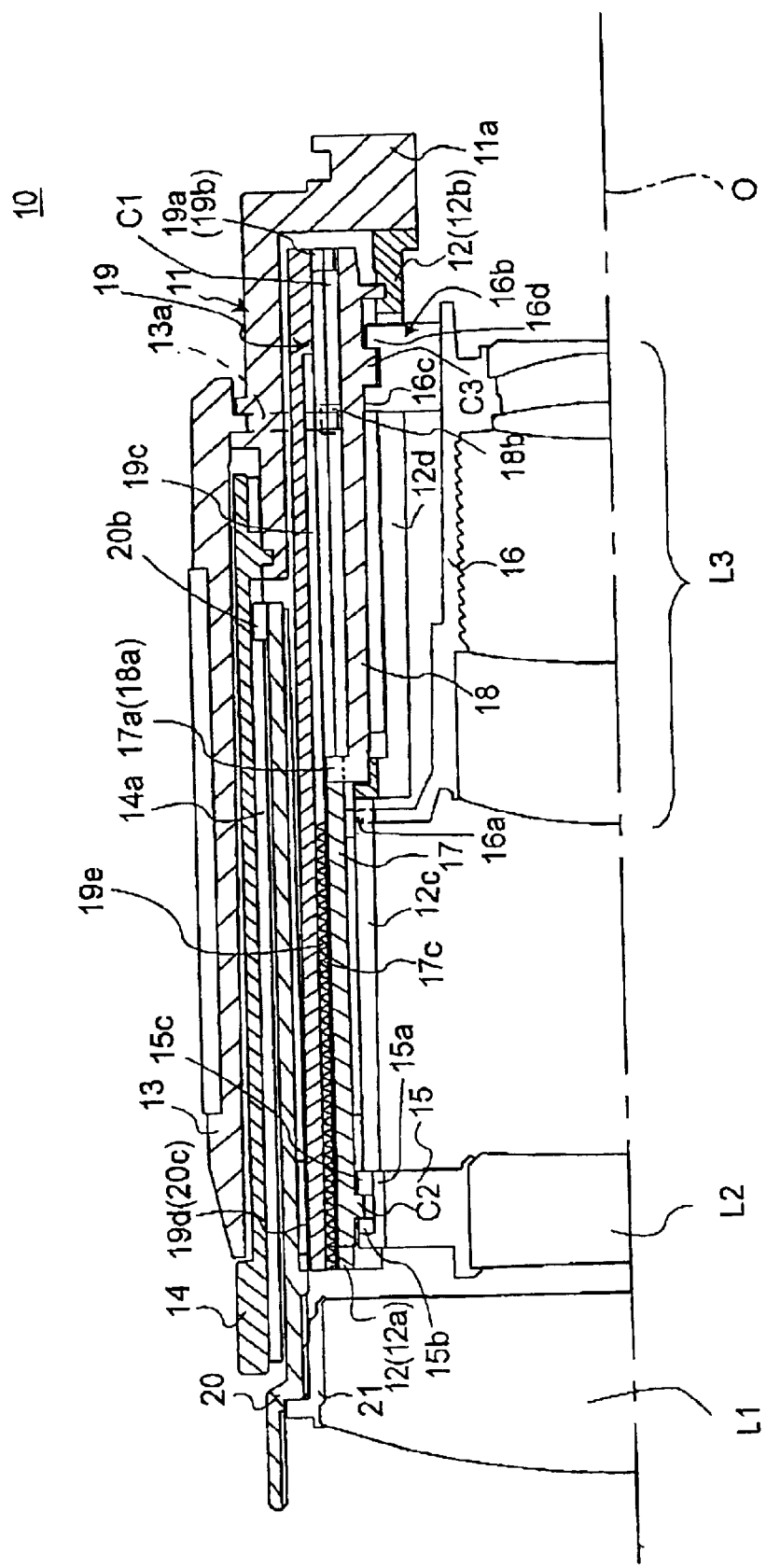
FIG. 1 is a longitudinal cross sectional view of an embodiment of an interchangeable zoom lens which incorporates a cam-rib-incorporated cam mechanism having a cam rib support structure according to the present invention, showing an upper half of the zoom lens from the optical axis thereof.

FIG. 1 shows an embodiment of an interchangeable zoom lens of an SLR camera system, wherein the zoom lens incorporates a cam-rib-incorporated cam mechanism having a cam rib support structure according to the present invention. First of all, the overall structure of the zoom lens 10 will be discussed hereinafter. The zoom lens 10 is provided with a photographing optical system having three lens groups, i.e., a first lens group L1, a second lens group L2 and a third lens group L3 as shown in FIG. 1. In this photographing optical system, all of the first, second and third lens groups L1, L2 and L3 move along an optical axis O to perform a zooming operation, and the first lens group L1 moves along the optical axis O to perform a focusing operation.

The zoom lens 10 is provided with a mount ring 11 serving as a stationary ring. The mount ring 11 is provided at a rear end thereof with a mounting portion 11a which is detachably attached to a camera body (not shown). The zoom lens 10 is provided inside the mount ring 11 with a stationary ring 12 which is fixed to the mount ring 11. The zoom lens 10 is provided around the mount ring 11 with a focus ring (manual operating ring) 14, and is provided around the focus ring 14 with a zoom ring (manual operating ring) 13. The zoom ring 13 and the focus ring 14 are supported by the mount ring 11 to be freely rotatable about the optical axis O without moving along the optical axis O with respect to the mount ring 11.

Figure 2:
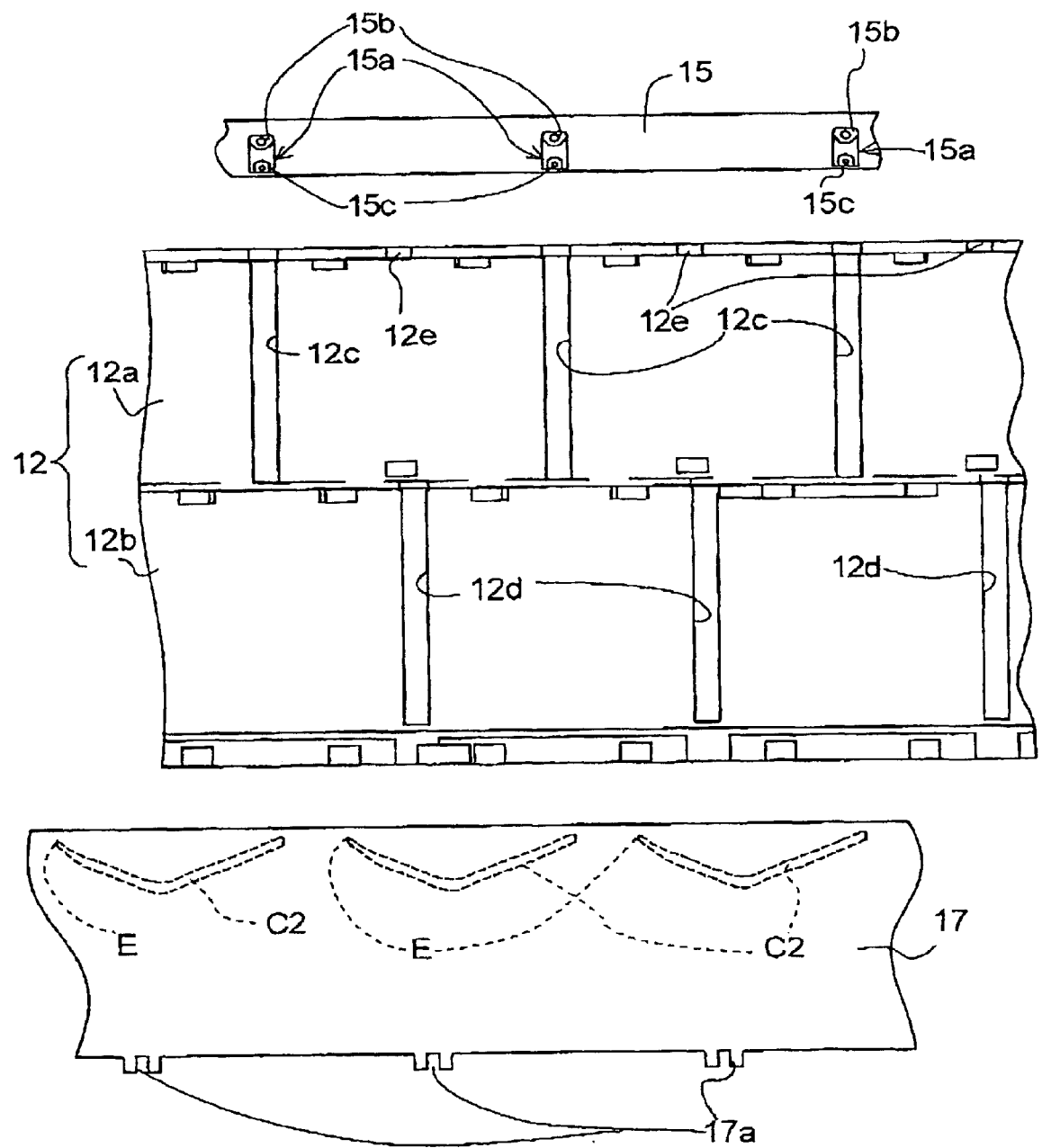
FIG. 2 is an exploded and developed view of a second lens group support ring, a stationary ring and a first cam ring of the zoom lens shown in FIG. 1.

The stationary ring 12 is provided with a front large-diameter portion 12a and a rear small-diameter portion 12b positioned behind the front large-diameter portion 12a. The front large-diameter portion 12a is provided with three front linear guide slots 12c extending parallel to the optical axis O, while the rear small-diameter portion 12b is provided with three rear linear guide slots 12d extending parallel to the optical axis O. The second lens group L2 is fixed to a second lens group support frame 15 to be supported thereby. The second lens group support frame 15 is fitted into the front large-diameter portion 12a. The second lens group support frame 15 is provided on an outer peripheral surface thereof with three linear guide projections 15a which project radially outwards to be slidably engaged in the three front linear guide slots 12c of the front large-diameter portion 12a, respectively (see FIG. 2). Accordingly, the second lens group support frame 15 is guided linearly in the optical axis direction without rotating about the optical axis O with respect to the stationary ring 12 due to the engagement of the three linear guide projections 15a with the three front linear guide slots 12c. The third lens group L3 is fixed to a third lens group support frame 16 to be supported thereby. The third lens group support frame 16 is fitted into the rear small-diameter portion 12b. The third lens group support frame 16 is provided at the front end thereof with three first linear guide projections 16a which project radially outwards to be slidably engaged in the three rear linear guide slots 12c of the front large-diameter portion 12a, respectively, and is further provided in the vicinity of the rear end thereof with three second linear guide projections 16b which project radially outwards to be slidably engaged in the three rear linear guide slots 12d on the rear small-diameter portion 12b. Accordingly, the third lens group support frame 16 is guided linearly in the optical axis direction without rotating about the optical axis O with respect to the stationary ring 12 due to the engagement of the three linear guide projections 16a with the three front linear guide slots 12c and the engagement of the three second linear guide projections 16b with the three rear linear guide slots 12d.

The zoom lens 10 is provided around the stationary ring 12 with a first cam ring 17 and a second cam ring 18. The first cam ring 17 is fitted on the large-diameter portion 12a to be freely rotatable about the optical axis O without moving along the optical axis O with respect to the large-diameter portion 12a, and the second cam ring 18 is fitted on the small-diameter portion 12b to be freely rotatable about the optical axis O without moving along the optical axis O with respect to the small-diameter portion 12b. The first cam ring 17 is provided at a rear end thereof with three pairs of engaging projections 17a (see FIG. 2) which project rearwards, while the second cam ring 18 is provided at a front end thereof with three engaging projections 18a (see FIGS. 3 and 4) which project radially outwards to be engaged with the three pairs of engaging projections 17a, respectively, so that the first cam ring 17 and the second cam ring 18 can integrally rotate at all times. The second cam ring 18 is provided on an outer peripheral surface thereof with a rotation transfer projection 18b which is elongated in a direction parallel to the optical axis O. The zoom ring 13 is provided on an inner peripheral surface thereof with a rotation transfer arm 13a which projects radially inwards to be engaged with the rotation transfer projection 18b of the second cam ring 18. Accordingly, manually rotating the zoom ring 13 causes both the first cam ring 17 and the second cam ring 18 to rotate together with the zoom ring 13 due to the engagement of the rotation transfer arm 13a with the rotation transfer projection 18b.

Figure 3:
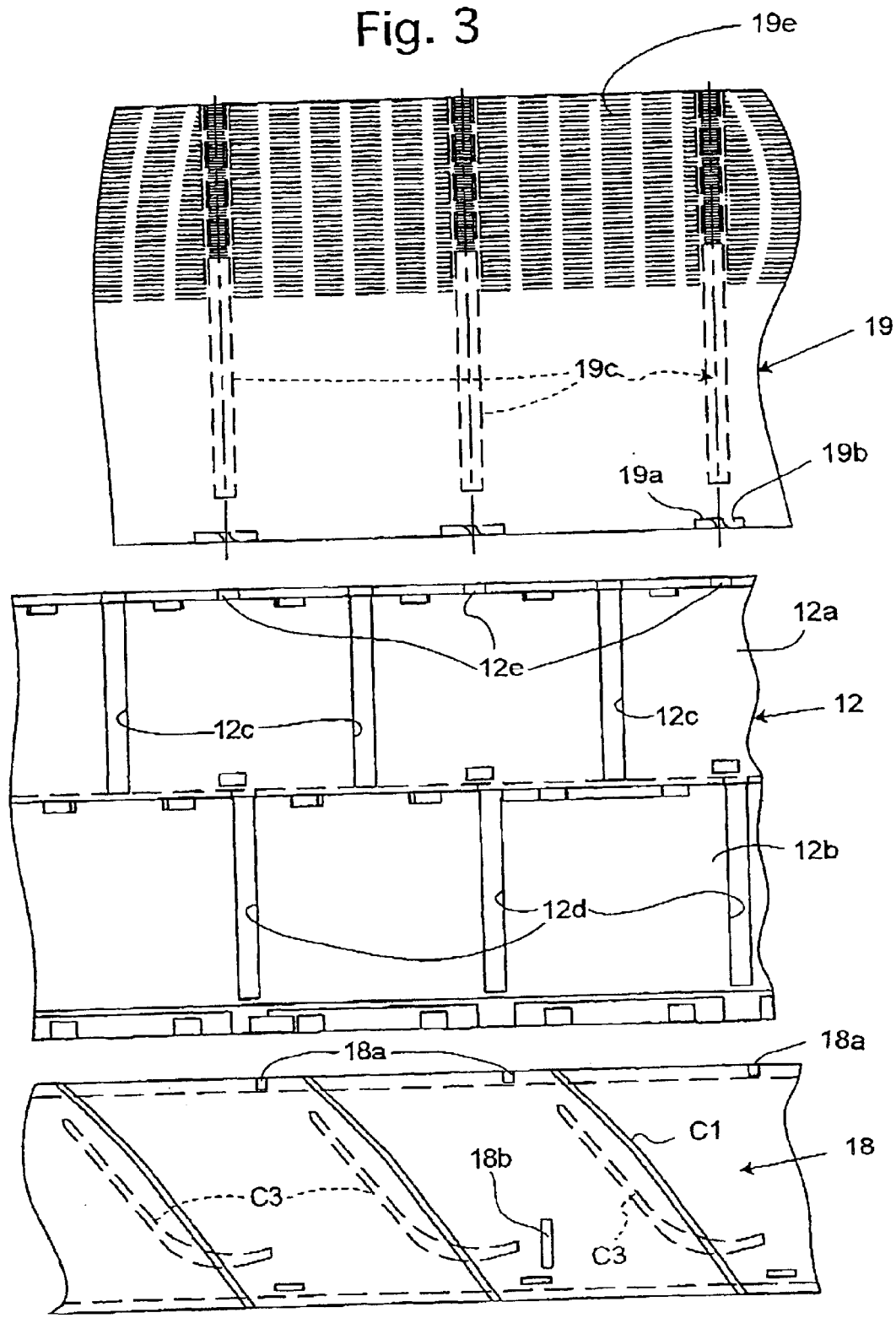
FIG. 3 is an exploded and developed view of a first lens group support ring, the stationary ring and a second cam ring of the zoom lens shown in FIG. 1.
Figure 4:
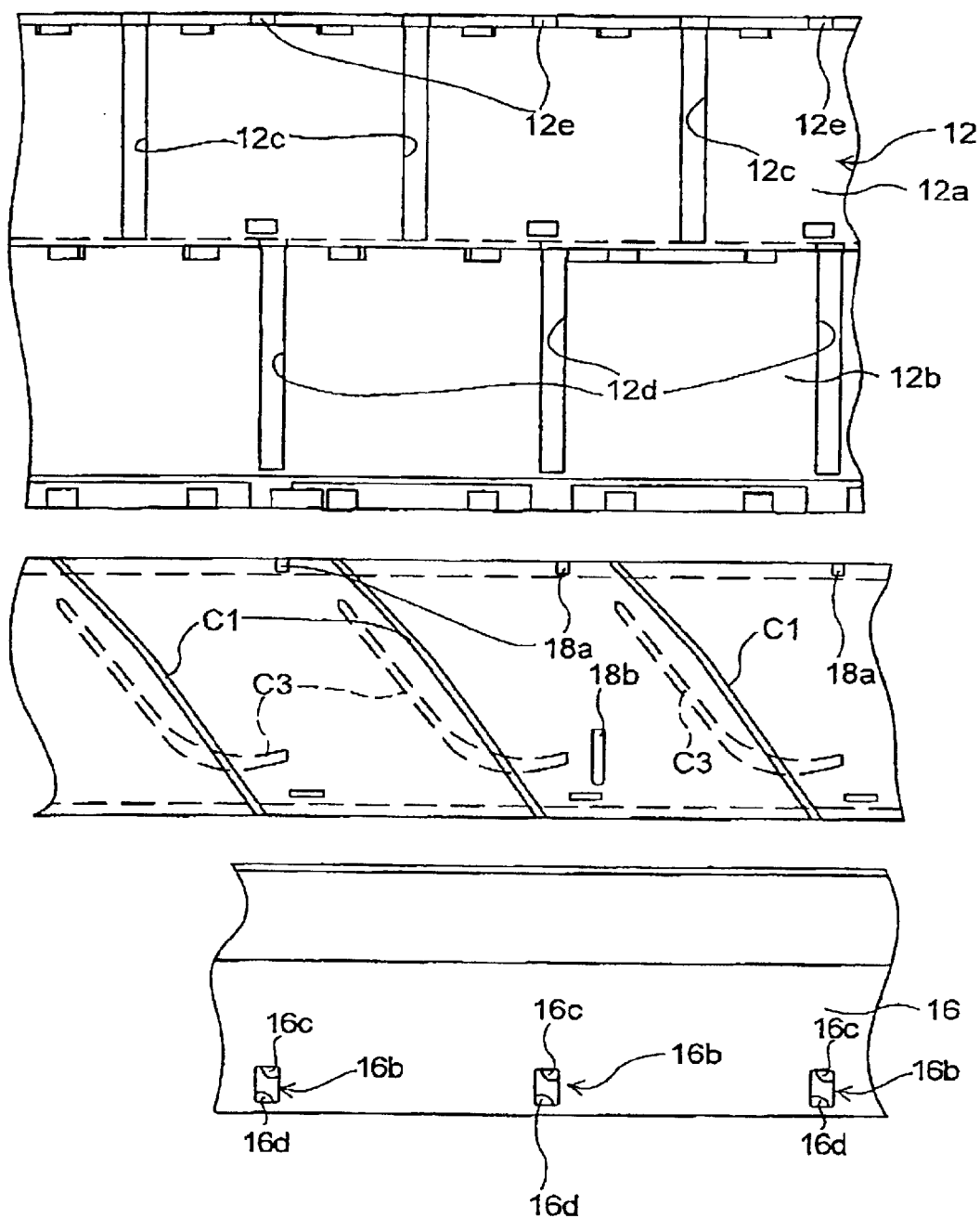
FIG. 4 is an exploded and developed view of the stationary ring, the second cam ring and a third lens group support ring of the zoom lens shown in FIG. 1.

The second cam ring 18 is provided on an outer peripheral surface thereof with three first cam ribs C1, and is provided on an inner peripheral surface of the second cam ring 18 with three third cam ribs C3 (see FIGS. 3 and 4). The first cam ring 17 is provided on an inner peripheral surface thereof with three second cam ribs C2 (see FIG. 2). The zoom lens 10 is provided around the first cam ring 17 and the second cam ring 18 with a first moving ring 19. The first moving ring 19 is provided at the rear end thereof on an inner peripheral surface of the first moving ring 19 with three pairs of cam followers 19a and 19b (see FIG. 3) each pair of which is engaged with the associated first cam rib C1 of the second cam ring 18 in a manner to hold the first cam rib C1 between the pair of cam followers 19a and 19b.

The first moving ring 19 is provided on an inner peripheral surface thereof with three linear guide grooves 19c which extend parallel to the optical axis O. The stationary ring 12 is provided at the front end thereof with three engaging projections 12e (see FIGS. 2 and 3) which are engaged in the three linear guide grooves 19c of the first moving ring 19, respectively. The first moving ring 19 is provided at the front end thereof on an outer peripheral surface of the first moving ring 19 with a male thread portion 19d. The zoom lens 10 is provided around the front of the first moving ring 19 with a first lens group support frame 20. The first lens group support frame 20 is provided on an inner peripheral surface thereof with a female thread portion 20c which is engaged with the male thread portion 19d of the first moving ring 19. The first lens group L1 is fixed to a lens holder 21 which is screwed into the first lens group support frame 20 to be fixed thereto as shown in FIG. 1. Accordingly, a rotation of the second cam ring 18 (the zoom ring 13) causes the first moving ring 19 (the first lens group L1), which is guided linearly along the optical axis O without rotating about the optical axis O by the engagement of the three engaging projections 12e with the three linear guide grooves 19c, to move linearly along the optical axis O in accordance with the contours of the three first cam ribs C1.

Each of the three second linear guide projections 16b of the third lens group support frame 16 is provided at the end thereof with a pair of cam followers 16c and 16d, each pair of which is engaged with the associated third cam rib C3 of the second cam ring 18 in a manner to hold the third cam rib C1 between the pair of cam followers 16c and 16d (see FIG. 4). Likewise, each of the three linear guide projections 15a of the second lens group support frame 15 is provided at the end thereof with a pair of cam followers 15b and 15c, each pair of which is engaged with the associated second cam rib C2 of the second cam ring 18 in a manner to hold the second cam rib C2 between the pair of cam followers 15b and 15c (see FIG. 2). Since each of the second lens group support frame 15 and the third lens group support frame 16 is guided linearly along the optical axis by the stationary ring 12 without rotating, a rotation of the first cam ring 17 and the second cam ring 18 (a rotation of the zoom ring 13) causes the second lens group support frame 15 (the second lens group L2) to move along the optical axis O in accordance with the contours of the three second cam ribs C2, and further causes the third lens group support frame 16 (the third lens group L3) to move along the optical axis O in accordance with the contours of the three third cam ribs C3 to perform a zooming operation together with the above described linear movement of the first moving ring 19 (the first lens group L1) in accordance with the contours of the three first cam ribs C1.

The first lens group support frame 20 is provided on an outer peripheral surface thereof with three radial projections 20b (only one of them appears in FIG. 1) which project radially outwards to be engaged in three rotation transfer grooves 14a (only one of them appears in FIG. 1) which are formed on an inner peripheral surface of the focus ring 14 to extend parallel to the optical axis O. Accordingly, manually rotating the focus ring 14 causes the first lens group support frame 20 to move along the optical axis O while rotating about the optical axis O with respect to the first moving ring 19, which is guided linearly along the optical axis O without rotating, due to the engagement of the female thread portion 20c with the male thread portion 19d to perform a focusing operation.

The first cam ring 17 is provided on an outer peripheral surface thereof with a light-shielding knurled surface 17c (see FIG. 1), while the first moving ring 19 is provided, on an inner peripheral surface thereof which faces the light-shielding knurled surface 17c, with a light-shielding knurled surface 19e (see FIGS. 1 and 3) which faces the light-shielding knurled surface 17c.

The present invention is applied to the cam rib support structure of the zoom lens 10 which is provided between the set of three second cam ribs C2 and the three pairs of cam followers 15b and 15c. This cam rib support structure will be hereinafter discussed in detail with reference mainly to FIGS. 5 and 6. The first cam ring (cam ring) 17, which includes the set of second cam ribs C2, is made of synthetic resin. Likewise, the second lens group support ring (follower ring) 15, which includes the three pairs of cam followers 15b and 15c, is also made of synthetic resin. As clearly shown in FIG. 2, each second cam rib C2 is shaped like a substantially bilateral-symmetrical letter V the interior angle of which is an obtuse angle so that the circumferential component is greater than the axial component in each second can rib C2. Each pair of cam followers 15b and 15c, which holds such a second cam rib C2 therebetween, are positioned apart from each other in the optical axis direction (the vertical direction as viewed in FIG. 2) Each pair of cam followers 15b and 15c cannot hold the associated second cam rib C2 if positioned apart from each other only in a circumferential direction of the second lens group support ring 15.

Figure 5:
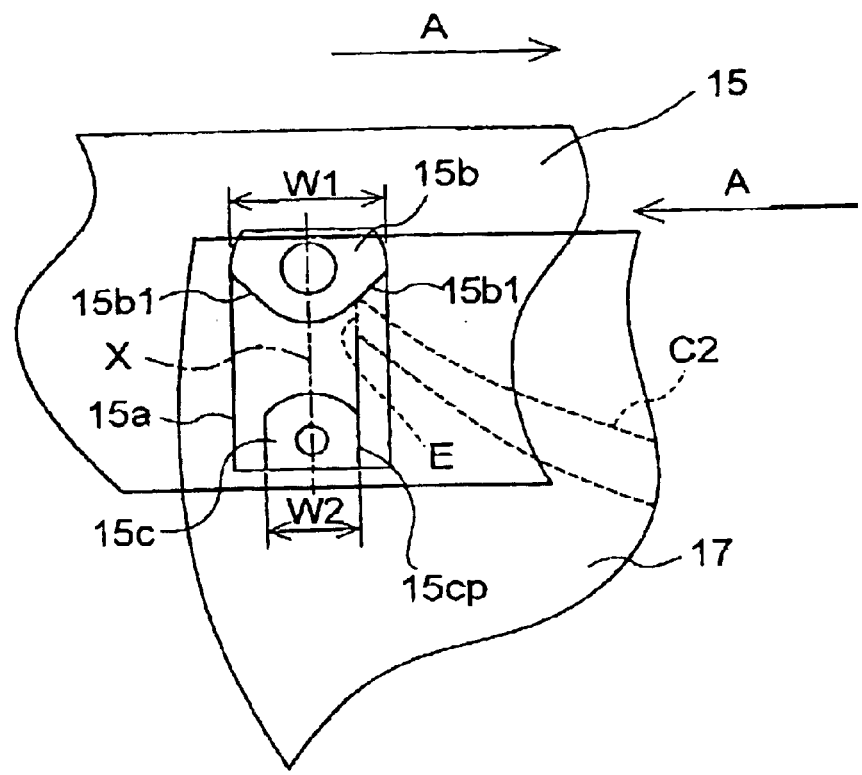
FIG. 5 is developed view of a fundamental portion of the cam rib support structure in the zoom lens shown in FIG. 1.
Figure 6:
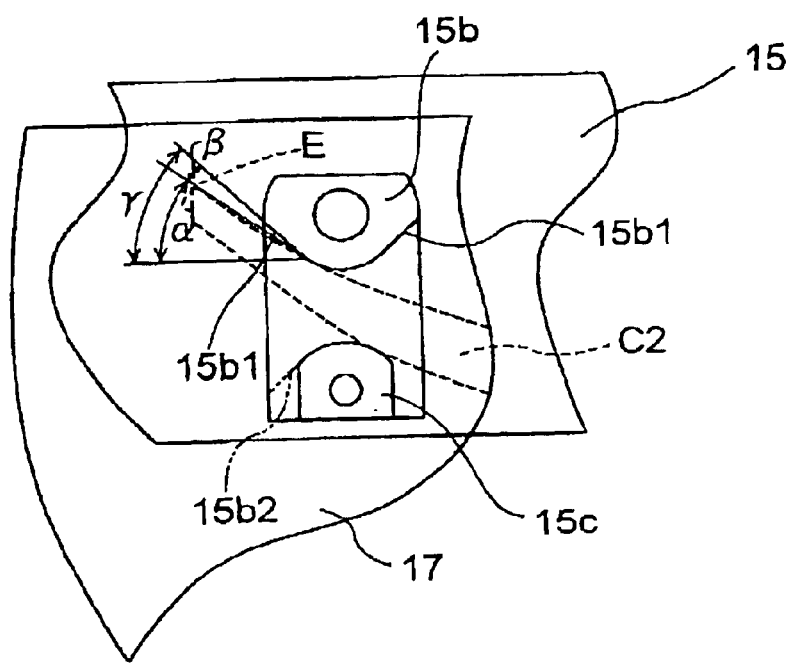
FIG. 6 is a view similar to that of FIG. 5 in a different state.

As can be clearly seen in FIGS. 5 and 6, the cam follower 15b of each linear guide projection 15a has a partial-cylindrical contact surface which slidably contacts with the associated second cam rib C2, while the cam follower 15c of each linear guide projection 15a has a partial-cylindrical contact surface which slidably contacts with the associated second cam rib C2. Both the center of the curvature of the partial-cylindrical contact surface of the cam follower 15b and the center of the curvature of the partial-cylindrical contact surface of the cam follower 15c lie on a straight line parallel to the optical axis O, whereas a circumferential width W1 of the cam follower 15b (the upper cam follower in FIGS. 5 and 6) is greater than a circumferential width W2 of the cam follower 15c (the lower cam follower in FIGS. 5 and 6). In addition, the pair of cam followers 15b and 15c of each linear guide projection 15a are positioned to be symmetrical to a center line X extending parallel to the axis of the second lens group support ring 15, i.e., parallel to the optical axis O. In the process of inserting the second lens group support ring 15 into the front large-diameter portion 12a of the stationary ring 12 on which the first cam ring 17 is fitted, firstly the cam follower 15c of each linear guide projection 15a approaches one of opposite ends (insertion end) of the associated second cam rib C2 in the lengthwise direction thereof (i.e., an end E of the associated second cam rib C2 shown in FIGS. 2 and 5), and subsequently the cam follower 15b of each linear guide projection 15a approaches the end E of the associated second cam rib C2. Accordingly, if the cam follower 15b and the cam follower 15c of each linear guide projection 15a are considered as an outer cam follower and an inner cam follower, respectively, a portion of the outer cam follower 15b (a right part thereof as viewed in FIG. 5) is extended outwards (rightwards as viewed in FIG. 5) from the position of a peripheral surface 15cp of the inner cam follower 15c in a circumferential direction (the horizontal direction as viewed in FIG. 5) of the second lens group support ring 15 due to the above described structure wherein the circumferential width W1 of the outer cam follower 15b is greater than the circumferential width W2 of the inner cam follower 15c. According to this structure, a straight line which is parallel to the optical axis O and which lies on the aforementioned peripheral surface 15cp of the inner cam follower 15c passes through the outer cam follower 15b.

A process of inserting the second lens group support ring 15 into the front large-diameter portion 12a of the stationary ring (linear guide ring) 12 on which the first cam ring 17 is fitted will be discussed hereinafter. The second lens group support ring 15 is fitted into the front large-diameter portion 12a of the stationary barrel 12 from the front end thereof so that the set of three linear guide projections 15a are engaged in the set of three front linear guide slots 12c, respectively. At this time, the first cam ring 17 has been positioned around the front large-diameter portion 12a of the stationary barrel 12. Subsequently, engage the second lens group support ring 15 with the first cam ring 17, the first cam ring 17 and the second lens group support ring 15 are moved relative to each other in the optical axis direction so that the end E of each second cam rib C2 firstly approaches and passes by the inner cam follower 15c of the associated linear guide projection 15a, and subsequently comes into contact with the outer cam follower 15b of the associated linear guide projection 15a as shown in FIG. 5. In this state shown in FIG. 5, rotating the second lens group support ring 15 and the first cam ring 17 relative to each other in opposite rotational directions shown by arrows A in FIG. 5 causes each second cam rib C2 to be positioned between the pair of cam followers 15b and 15c of the associated linear guide projection 15a as shown in FIG. 6. The relative rotational position between the second lens group support ring 15 and the first cam ring 17 at the time of assembling the second lens group support ring 15 and the first cam ring 17 together can be predetermined so that the end E of each second cam rib C2 reliably comes into contact with the inner cam follower 15b of the associated linear guide projection 15a when the second lens group support ring 15 and the first cam ring 17 are moved relative to each other in the optical axis direction after the second lens group support ring 15 has been fitted into the front large-diameter portion 12a of the stationary barrel 12 with the set of three linear guide projections 15a being respectively engaged in the set of three front linear guide slots 12c. This makes the process of assembling the second lens group support ring 15 and the first cam ring 17 together very easy.

It is generally the case that such an assembly process is carried out with the axial direction of the first cam ring 17 and the second lens group support ring 15 being oriented vertically. Accordingly, in a conventional lens barrel, there is a possibility of a lens group support ring (corresponding to the second lens group support ring 15) which is inserted into a front large-diameter portion (corresponding to the front large-diameter portion 12a) accidentally falling therein, toward a rear small-diameter portion (corresponding to the front large-diameter portion 12b), to hit a lens group (corresponding to the third lens group L3) to thereby damage the lens group. However, unlike a conventional lens barrel, in the present invention there is no possibility of the second lens group support ring 15 falling down and hitting the third lens group L3 because the end E of each second cam rib C2 is reliably made to contact the inner cam follower 15b of the associated linear guide projection 15a.

In the illustrated embodiment of the zoom lens 10, an engaging portion of the outer cam follower 15b of each linear guide projection 15a which is slidably engaged with the associated second cam rib C2 is formed as a cylindrical surface portion while an engaging portion of the inner cam follower 15c of each linear guide projection 15a which is slidably engaged with the associated second cam rib C2 is formed as a cylindrical surface portion. Opposite side end portions of each outer cam follower 15b with respect to the center line X (see FIG. 5) are provided with two beveled surfaces 15b1, respectively, which extend away from each other from the aforementioned cylindrical surface portion of the outer cam follower 15b so that the end E of the associated second cam rib C2 can easily be led into the space between the outer cam follower 15b and the inner cam follower 15c. It is determined that an angle γ (gamma) of each beveled surface 15b1 with respect to a circumferential direction of the second lens group support ring 15 is greater than a maximum intersecting angle α (alpha) of the associated second cam rib C2 (γ=α+β).

It is desirable that the difference between the circumferential width W1 of the outer cam follower 15b and the circumferential width W2 of the inner cam follower 15c be as great as possible in consideration of the shape of each second cam rib C2. Although the pair of cam followers 15b and 15c of each linear guide projection 15a are positioned to be symmetrical to the center line X in the above illustrated embodiment, the inner cam follower 15c can be disposed to be offset from the outer cam follower 15b. In addition, as shown in FIG. 6, the inner cam follower 15c of each linear guide projection 15a can be provided either side thereof in a circumferential direction of the second lens group support ring 15 with a beveled surface 15b2 (shown by a two-dot chain line in FIG. 6) which is similar to each beveled surface 15b1.

The present invention can be applied not only to an interchangeable zoom lens such as the above described interchangeable zoom lens 10, but also to two concentrically arranged ring members of any other device which have a cam rib support structure between the two annular members. The present invention can be applied not only to the case where one or more cam ribs are formed on an inner peripheral surface of a ring member such as the first cam ring 17, but also to the case where one or more cam ribs are formed on an outer peripheral surface of a ring member.

As can be understood from the foregoing, according to the present invention, in a cam rib support structure of a cam mechanism including a cam ring and a follower ring which are concentrically arranged, wherein at least one cam rib extending non-linearly is formed on an inner or outer peripheral surface of the cam ring while corresponding at least one pair of cam followers are formed on an outer or inner peripheral surface of the follower ring, the cam rib can be easily engaged in between the pair of cam followers.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A cam mechanism comprising:
   a cam ring including at least one cam rib which is formed on a peripheral surface of said cam ring to extend non-linearly; and
   a follower ring which is concentric with said cam ring, said follower ring including at least one pair of cam followers which are formed on a peripheral surface of said follower ring to be positioned apart from each other in an axial direction of said follower ring to hold said cam rib between said pair of cam followers, wherein, upon said cam ring and said follower ring being engaged with each other in an assembly process thereof, an inner cam follower of said pair of cam followers firstly approaches one of opposite ends of said cam rib in a lengthwise direction thereof, and an outer cam follower of said pair of cam followers subsequently approaches said one of said opposite ends of said cam rib, and wherein a portion of said outer cam follower is extended outwards from a position of a peripheral surface of said inner cam follower in a circumferential direction of said follower ring.

2. The cam mechanism according to claim 1, wherein a circumferential width of said outer cam follower is greater than a circumferential width of said inner cam follower.

3. The cam mechanism according to claim 2, wherein said outer cam follower and said second cam follower are positioned to be symmetrical to a center line extending parallel to an axis of said follower ring.

4. The cam mechanism according to claim 3, wherein opposite side end portions of said outer cam follower with respect to said center line each comprise a beveled surface, so that said one of opposite ends can easily be led into a space between said outer cam follower and said inner cam follower.

5. The cam mechanism according to claim 1, wherein said cam ring and said follower ring are elements of a lens barrel, said follower ring being guided linearly along an optical axis of said lens barrel without rotating.

6. The cam mechanism according to claim 5, wherein said lens barrel comprises a linear guide member having at least one linear guide groove for guiding said follower ring linearly along said optical axis without rotating said follower ring, said pair of cam followers being formed on an end of a linear guide projection which is engaged in said linear guide groove.

7. The cam mechanism according to claim 1, further comprising an intermediate ring which is disposed concentrically between said cam ring and said follower ring, wherein one of said cam ring and said follower ring is inserted into said intermediate ring in said assembly process of said cam ring and said follower ring.

8. The cam mechanism according to claim 5, wherein said lens barrel serves as a photographing lens.

9. A cam mechanism comprising:

a cam ring including at least one cam rib which is formed on a peripheral surface of said cam ring to extend non-linearly; and a follower ring which is concentric with said cam ring, and includes at least one pair of cam followers which are formed on a peripheral surface of said follower ring to be positioned apart from each other in an axial direction of said follower ring to hold said cam rib between said pair of cam followers, wherein said pair of cam followers are positioned to be symmetrical to a center line extending parallel to an axis of said follower ring, and wherein, upon said cam ring and said follower ring being engaged with each other in an assembly process thereof, a circumferential width of one of said pair of cam followers which firstly approaches one of opposite ends of said cam rib in a lengthwise direction thereof is smaller than a circumferential width of the other of said pair of cam followers which subsequently approaches said one of said opposite ends of said cam rib.

* * * * *